United States Patent [19]

Congdon et al.

[11] Patent Number: 4,596,749
[45] Date of Patent: Jun. 24, 1986

[54] METHOD AND APPARATUS FOR ADDING ELECTROLYTE TO A FUEL CELL STACK

[75] Inventors: Joseph V. Congdon, Glastonbury; James G. English, Granby, both of Conn.

[73] Assignee: United Technologies Corporation, Hartford, Conn.

[21] Appl. No.: 638,336

[22] Filed: Aug. 6, 1984

[51] Int. Cl.⁴ .............................................. H01M 8/04
[52] U.S. Cl. ...................................... 429/14; 429/34; 429/41; 429/46; 429/72
[58] Field of Search ...................... 429/14, 34, 12, 27, 429/41, 46, 72

[56] References Cited

U.S. PATENT DOCUMENTS 4,176,213 11/1979 van Linden .................. 429/14 X
4,463,066 7/1984 Adlhart et al. ................... 429/34

Primary Examiner—Charles F. LeFevour
Attorney, Agent, or Firm—Stephen E. Revis

[57] ABSTRACT

Electrolyte is replenished in a fully assembled stack of fuel cells by depositing dilute electrolyte on tabs extending outwardly from an external vertical face of the stack. The electrolyte is absorbed into the cell components as it cascades off the tabs and down the face of the stack. When the electrodes and matrix layers of the stack are fully saturated the stack is heated and water is evaporated until the stack has an operable electrolyte volume and electrolyte concentration therein. In a preferred embodiment the tabs are extensions of the nonporous plates separating adjacent cells in the stack.

13 Claims, 2 Drawing Figures

METHOD AND APPARATUS FOR ADDING ELECTROLYTE TO A FUEL CELL STACK

DESCRIPTION

1. Technical Field

This invention relates to fuel cells and more particularly to adding electrolyte to fuel cells.

2. Background Art

As is well known, the electrolyte used in fuel cells is lost slowly over a period of time, mostly by evaporation into reactant gases passing through the cell. A matrix layer disposed between the electrodes of the cell holds the electrolyte in position between the electrodes during cell operation. The electrolyte within the matrix provides a liquid barrier preventing commingling of the fuel and oxidant gases which flow through the cell on opposite sides of the matrix. If too much electrolyte evaporates from the cell, the reactants may mix with each other through localized areas of the matrix. The electrochemical reaction also stops in those areas.

There is a need to be able to replenish the lost electrolyte at predetermined intervals, the intervals being chosen to assure that the electrolyte volume does not fall below some minimum, safe level. It is desired to be able to refill the cells to a predetermined level and concentration which is uniform from cell to cell. It is too costly to take the stack apart to add acid to the individual cells of the stack. A system is needed to enable the refilling of the cells in a stack without disassembling the stack.

Several U.S. patents representative of the prior art relating to filling fuel cells stacks with electrolyte are U.S. Pat. Nos. 4,366,211; 4,383,008; and 4,383,009. All of these prior art systems require numerous additional stack pieces, as well as the addition of slots, drilled holes, and other modifications to most, if not all, of the fuel cell electrodes, matrices, and separator plates. The extra expense of these features and the difficulty in maintaining proper tolerances for hold alignment from cell to cell are undesirable. Also, in some of these prior art patents a head of electrolyte is established at the bottom end of the stack due to columns of the electrolyte interconnected vertically through the stack. This can result in an uneven distribution of electrolyte within the cells. The stack must also be sealed to hold that acid pressure during filling. None of these patents address the problem of obtaining the desired amount and concentration of electrolyte in each cell.

It is desirable to have an inexpensive system for adding electrolyte to fuel cells. Preferably the system should fill the stack uniformly to a desired electrolyte volume and concentration, and should not require significant redesign or reoperation of fuel cell stack components.

DISCLOSURE OF INVENTION

One object of the present invention is an improved system for adding electrolyte to an assembled fuel cell stack.

A further object of the present invention is a system of adding electrolyte to a fuel cell stack, which system does not require costly modifications to existing fuel cell stack components.

Another object of the present invention is a method for refilling a fuel cell stack with electrolyte to a predetermined operating volume and concentration.

Yet another object of the present invention is a system for adding electrolyte to a fuel cell stack uniformly throughout the height of the stack.

According to the present invention, in a fuel cell system a fuel cell stack includes a plurality of repeating fuel cell units disposed one atop the other, at least one of the sheet like elements of each of a plurality of said units extending outwardly from a vertical face of the stack defining a plurality of horizontal tabs spaced apart vertically one above the other, the stack assembly including means for depositing electrolyte directly upon at least the uppermost tab to wet all of the tabs and the entire vertical face of the stack either directly or by excess electrolyte cascading down the stack and over the face of the stack from one tab to the next until sufficient electrolyte is absorbed into the stack through the edges of cell components and fully saturates all of the electrodes and matrices, excess water from within the saturated stack thereafter being evaporated to the extent that a desired operable electrolyte volume and electrolyte concentration remains within the stack.

The major advantage of the present invention is in its simplicity. No special channels or holes need be formed in the stack components, and no extra stack pieces are required. At most, only one of the sheet-like elements of each fuel cell unit of the stack needs to be made slightly longer such that it extends beyond the vertical face of the stack forming a shelf or tab. The stack components which are preferred to be used to form the tabs are the nonporous sheet-like separators which are sandwiched between adjacent cells in the stack.

In one embodiment electrolyte is simply dripped onto the surface of the uppermost tab, such as from a conduit disposed above the tab over its length. The conduit is fed electrolyte from a supply external of the stack. The electrolyte is dripped onto the surface of the uppermost tab through holes in the conduit. Some of the electrolyte cascades over the edges of the tab and down the vertical face of the stack to the next succeeding tab, and so forth until a continuous flow of electrolyte is running over the tabs and down the face of the stack. Some of this electrolyte is drawn into the stack components by capillary action through the edges of the components which are the electrodes and matrix layers of each cell in the stack. The separators are nonporous and absorb virtually no electrolyte during the process. Eventually all the electrodes and matrices become completely saturated.

The tabs help distribute the electrolyte uniformly over the width and height of the face of the stack. Without the tabs, electrolyte deposited on the face of the stack may form narrow, localized rivulets along the stack face. Some of the electrolyte tends to accumulate on the tabs. Without the tabs the residence time of the electrolyte on the stack face would be shorter. This accumulated electrolyte rests on the tabs against the stack face thereby providing a "reservoir" of electrolyte which is continuously absorbed into the edges of the cell components immediately above each tab. This speeds the refilling process. The reservoir is continuously replenished as electrolyte is deposited on the tabs.

Preferably a cover fits over the vertical face of the stack to define a reactant gas manifold chamber for distribution (during cell operation) reactant gas into channels which pass through the cells. Gas manifold chambers are well known in the art as shown in commonly owned U.S. Pat. No. 4,233,369. During electrolyte refilling the manifold acts as a collector of the excess electrolyte running off the stack face, which electrolyte may be recirculated and redeposited onto the tabs.

Commonly owned U.S. Patent Application Ser. No. 638,337 entitled "Process for Adding Electrolyte to a Fuel Cell Stack" by P. Grevstad, filed on even date herewith, describes and claims subject matter which is related to the present invention.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
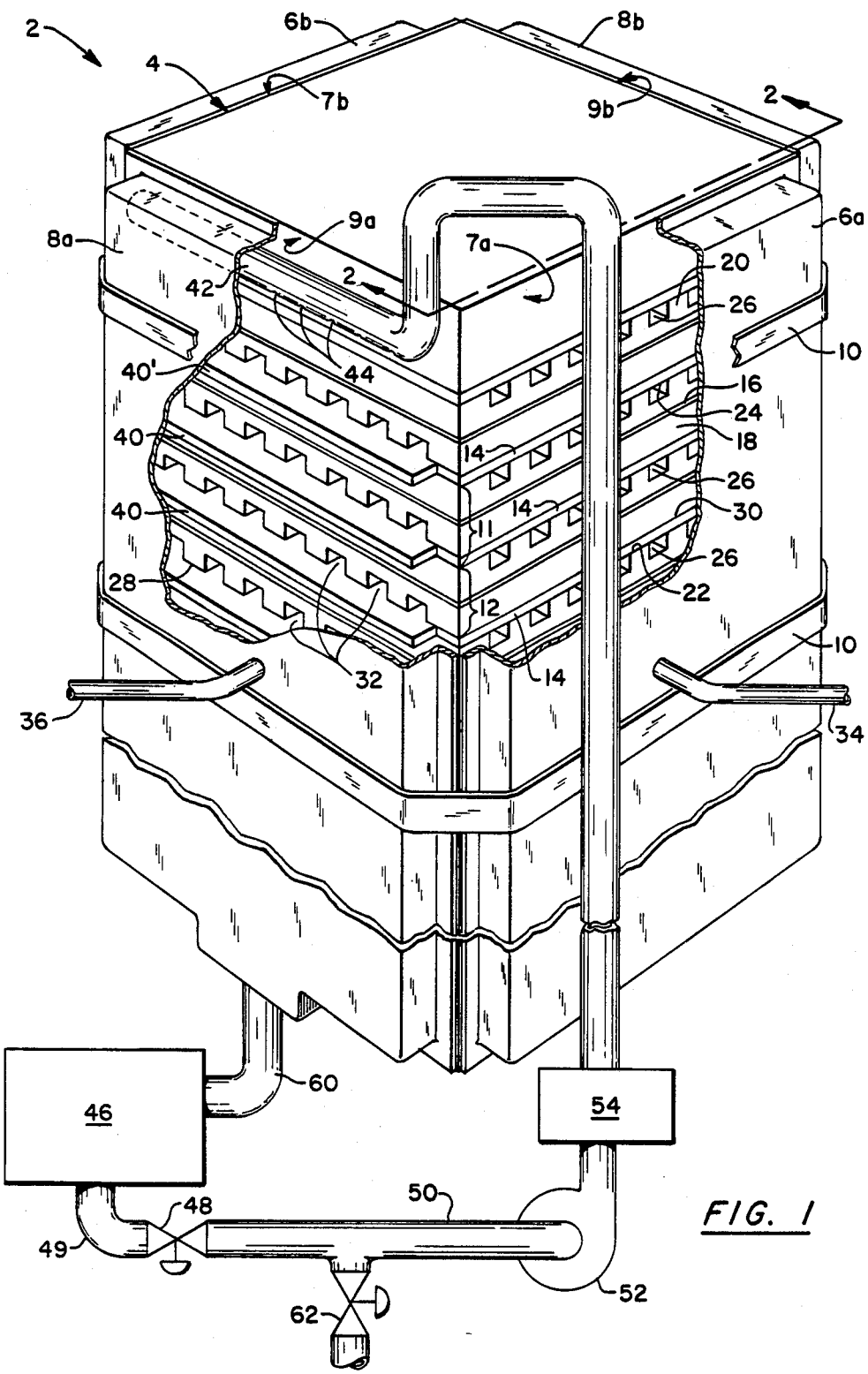
FIG. 1 is a simplified perspective view (not to scale), partly broken away, of a fuel cell system incorporating the features of the present invention.

Referring to FIG. 1, a fuel cell system is generally referred to by the reference numeral 2. In this preferred embodiment the electrolyte is phosphoric acid; however, the invention is not intended to be limited thereto. The assembly 2 includes a fuel cell stack 4 with reactant gas manifolds 6a, 6b, 8a, 8b covering each of the four external vertical faces 7a, 7b, 9a, 9b, respectively, of the stack. Manifolds 6a, 6b are the fuel (i.e. hydrogen) inlet and outlet manifolds, respectively; and manifolds 8a, 8b are the oxidant (i.e. air) inlet and outlet manifolds respectively. The manifolds are held in sealing relationship to the faces of the stack by any suitable means such as by a plurality of bands 10. The faces 7a, 7b, 9a, 9b are hereinafter referred to, respectively, as the fuel inlet face, fuel outlet face, oxidant inlet face and oxidant outlet face.

Each stack 4 is comprised of a plurality of repeating fuel cell units 11. The fuel cell units 11 are stacked one atop the other. A thick carbon end plate 13 rests on top of the stack. A stack may contain only a few cells or several hundreds of cells. Each cell may have an active (catalyzed) surface area of only a very few square inches up to 10 square feet or more, depending upon the application for which the system is designed. The present invention is particularly suited for use with stacks containing relatively large numbers of fuel cells of fairly large size, since those are the types of systems which are the most difficult to uniformly refill with electrolyte; however, the present invention is not intended to be limited to any particular size cell or stack.

Each cell unit 11 comprises a fuel cell 12 and a sheet-like separator 14. The separator 14 is flat and substantially nonporous to both the reactant gases and the electrolyte. Separators may be made by any known method from any material which is compatible with and can withstand the operating environment within the cells. When the fuel cell electrolyte is phosphoric acid these plates are usually made from graphite. For example, they may be made by molding, under pressure, a dry mixture of graphite powder and thermosetting resin, the molded parts subsequently being cured and then heat treated to a temperature of at least 2000° C. to graphitize the resin. Preferably the separator is no greater than 50 mils thick with 30 to 40 mils thick being most preferred. A suitable separator plate is described in commonly owned U.S. Pat. No. 4,301,222, Emanuelson et al, and is incorporated herein by reference.

The fuel cells 12 may be similar to those shown and described in commonly owned U.S. Pat. No. 4,115,627 which is incorporated herein by reference. Each cell 12 includes a thin, sheet-like electrolyte retaining matrix layer 16 sandwiched between a sheet-like anode electrode 20 disposed on one side thereof and a sheet-like cathode electrode 18 disposed on the other side thereof. The matrix layer 16 between the anode and cathode electrodes may be a 5 mil thick layer of silicon carbide held together by a binder such as polytetra-fluoroethylene, and described in commonly owned U.S. Pat. No. 4,017,664, incorporated herein by reference.

The anode and cathode electrodes each comprise a relatively thick fibrous gas porous sheet-like substrate having a catalyst layer disposed on a flat surface thereof facing the matrix layer 16. The catalyst may have a thickness on the order of 2 to 5 mils. The substrate thickness may be on the order of about 80 mils thick. In phosphoric acid cells it is usually finely divided platinum or platinum alloy supported on carbon particles and bonded together with a fluorocarbon polymer. The catalyst is not critical to the present invention. Each anode electrode 20 includes a flat face 22 in contact with the lower surface 24 of a separator 14 disposed directly above it. A plurality of parallel grooves in the electrode face 22 and perpendicular to the fuel inlet face 7a form, with the separator 14, open channels 26 which extend through the fuel cell 11 to the opposite face 7b of the stack 4. The channels provide gas communication between the fuel inlet manifold 6a and fuel outlet manifold 6b.

Similarly, each cathode electrode 18 has a flat face 28 in contact with the upper surface 30 of the separator disposed immediately below it. The cathode electrode 18 also includes a plurality of parallel grooves in its face 28 perpendicular to the oxidant inlet face 9a and forming, with the separator 14, open channels 32 extending across the stack 4 from the oxidant inlet manifold 8a to the oxidant outlet manifold 8b. The edges of the anode electrodes 20, defining the stack fuel inlet and fuel outlet faces 7a, 7b, respectively, are preferably treated or manufactured such that they act as gas seals which prevent fuel traveling in the channels 26 from leaking into the oxidant manifolds 8a, 8b. Similarly, the edges of the cathode electrodes 18 which form a portion of each of the fuel faces 7a, 7b of the stack 4 are also treated or manufactured to act as gas seals to prevent air from leaking from the channels 32 into the fuel manifolds 6a, 6b. Commonly owned U.S. Pat. No. 4,269,642 describes one method for forming gas seals along the edges of electrode substrates and is incorporated herein by reference.

During normal fuel cell operation fuel enters the manifold 6a via a conduit 34 and travels through the cells via the channels 26 into the fuel outlet manifold 6b. The depleted fuel gas is then carried away from the stack (or recirculated) by means not shown. An oxidant, such as air, enters the oxidant manifold 8a via the conduit 36 and passes through the cells into the oxidant outlet manifold 8b via the channels 32, and is carried away from the stack by means not shown.

In accordance with the present invention each separator 14 extends outwardly from the air inlet face 9a over substantially the full width (i.e. horizontal dimension) of the face to define a plurality of horizontal tabs 40 disposed one above the other over the height of the stack. The tabs 40 extend about one-quarter inch into the air inlet manifold 8a and may be several feet long in a large stack which is ten or more square feet in cell area. Disposed a short distance above the uppermost tab 40, which tab is herein designated by the reference numeral 40', is a conduit 42. The conduit 42 extends over the full length of the tab 40' and has a plurality of openings 44 along its undersurface, which openings are uniformly spaced apart over the length of the tab 40'. An electrolyte storage tank 46, external of the stack 4, holds phosphoric acid electrolyte (diluted with water to a predetermined concentration, as explained below) for use in replenishing the electrolyte lost from the stack 4 during cell operation.

When it is determined that a stack needs to have its electrolyte replenished, the stack is first taken off line. To add electrolyte to the stack 4 a valve 48 in a conduit 49 is opened which permits eletrolyte to flow from the tank 46 into a conduit 50. The electrolyte is pumped through the conduit 50 to the conduit 42 (disposed within the manifold 8a) by a pump 52. A filter 54 disposed within the conduit 50 assures that the electrolyte added to the stack 4 is clean.

Figure 2:
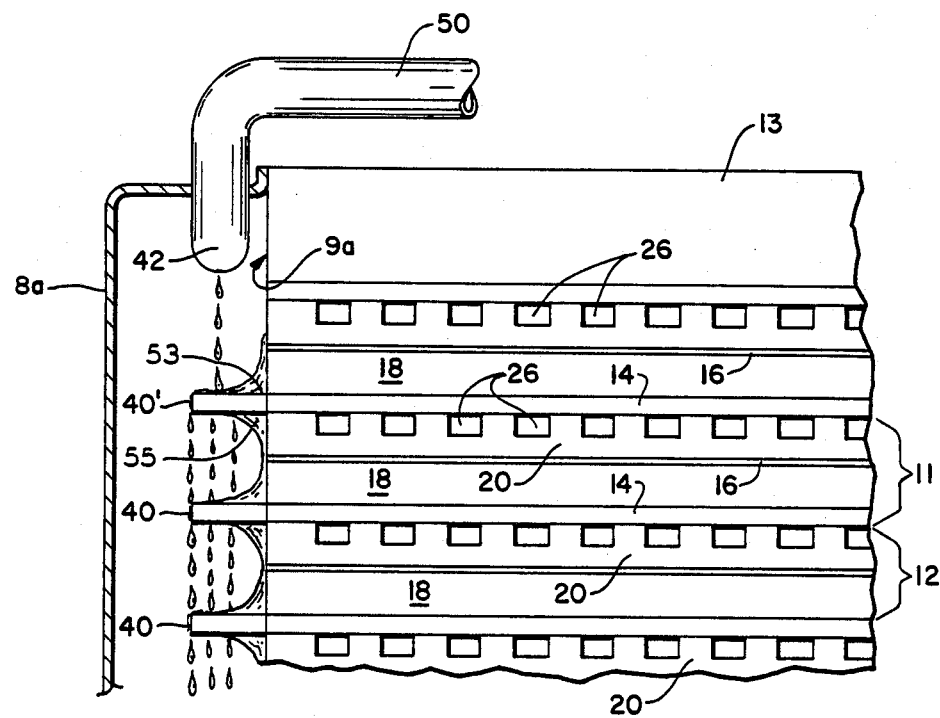
FIG. 2 is an enlarged sectional view taken along the line 2—2 of FIG. 1.

As best seen in FIG. 2, the electrolyte drips from the openings 44 in the conduit 42 onto the uppermost tab 40'. Since the tabs are nonporous, the electrolyte flows over the edges of the uppermost tab 40' onto the tabs below it and down the vertical oxidant inlet face 9a of the stack 4. Some of the electrolyte accumulates, such as in puddles or otherwise, along the back edge 53 of the tabs 40 and is thus in contact with the edges of the fuel cell components, such as the edges of the matrices 16, the anode electrodes 20 and the cathode electrodes 18. These components are porous, and the electrolyte which comes into contact with their edges is drawn into them and across the cells by capillary action. If the tabs 40 are close enough together an electrolyte film 55 will form against the face of the stack along the horizontal length of the tabs, bridging the gap between adjacent tabs and providing a continuous source of electrolyte to be drawn into the edges of the electrodes and matrix. The cathode electrodes may absorb electrolyte faster than the anode electrodes since the edges of the anode electrodes along the oxidant inlet face 9a of the stack will normally be less porous than the cathode electrode edges due to the presence of the gas seal discussed above. Electrolyte also runs into and fills the channels 32 which are about 0.050 inch high by 0.035 inch wide, in cross section, a size which is small enough to create capillary forces to hold the electrolyte. Electrolyte which is not absorbed by the stack runs off the stack face and off the tabs to the bottom of the oxidant inlet manifold 8a. A conduit 60 attached to the bottom of the manifold 8a feeds that excess electrolyte back into the tank 46 for recirculation.

Electrolyte is added and recirculated until a steady state is reached wherein both the anode and cathode electrodes and the matrix layers of every cell in the stack are completely saturated with electrolyte at the same concentration, and the channels 32 are completely filled. The valve 48 is then closed and a valve 62 is opened to drain electrolyte from the circulating system and from the manifold 8a. The volume of circulated electrolyte (i.e. the amount in the tank 46) is preferably large relative to the amount of electrolyte remaining in the stack just prior to refilling in order that the concentration of electrolyte in the fully saturated stack at steady state will be essentially the concentration of the electrolyte in the storage tank at the onset of the refilling operation. This eliminates the need to determine the amount and concentration of electrolyte in the stack at the beginning of the refilling operation.

With the electrolyte circulating system shut off, the external faces of the cells dry quickly. Also, the protruding tabs break up any continuous film of electrolyte which would otherwise extend vertically between adjacent cells and permit the existence of shunt currents. This is an advantage over prior art filling techniques wherein vertical internal channels may stay wet resulting in shunt currents which can causes serious corrosion of stack components and can also result in potentially large parasitic power losses.

As further explained below, it is necessary to known the total volume of electrolyte held by the stack when fully saturated. This volume will depend upon whether there is electrolyte within the reactant gas channels 32 after steady state has been reached. Unless the channels are completely empty or completely filled, it will not be possible to determine the total volume of electrolyte in the stack. Whether or not the gas channels will become filled may depend upon several factors. The size of the channels is one factor. Large channels will tend to remain empty while small channels will tend to fill and hold electrolyte by capillary action. Also, a slight forward or backward tilt to the face of the stack upon which the dilute electrolyte is deposited, as well as the method for depositing the electrolyte on the face will play a part in whether or not electrolyte enters and stays in those channels. Unless it is known that the channels are filled, it will be necessary to blow or otherwise remove the electrolyte from the channels prior to the evaporation phase of the refilling process to assure that all the channels are empty.

Before operating the stack to produce electricity the liquid volume in each cell must be reduced to a proper level for cell operation, and the electrolyte must also be brought to a suitable operating concentration. The stack is heated to a preselected temperature, which is preferably, but not necessarily, the temperature at which the stack normally operates. This may be done by various means. For example, the process could be conducted within an oven in which the stack is disposed; or heaters could be strapped onto the stack. Preferably the stack's own internal cooling system is used to heat the stack, such as by conducting hot liquid or gas through cooling tubes which pass through the stack at various locations. (Stack cooling systems are shown and described in commonly owned U.S. Pat. No. 4,233,369, Breault et al and U.S. Pat. No. 4,245,009, Guthrie, both of which are incorporated herein by reference.) Simultaneously with the heating of the stack, a moist gas, such as nitrogen or air, having a known dew point, is passed through the fuel channels 26 and/or oxidant channels 32 (if they are empty). During this heating phase water evaporates into the moist gas stream. The process is continued until a steady state is reached and no further water evaporates from the stack. This occurs when the vapor pressure of the water in the gas equals the vapor pressure of the water in the cells. Steady state conditions will determine the final volume of liquid in the stack and the concentration of electrolyte remaining in the stack. Given the known liquid volume held by the stack when fully saturated, other variables, such as the initial concentration of electrolyte in the recirdulation storage tank, the dew point of the moist gas stream, and the final temperature of the stack during the evaporation phase of the refilling process are selected to yield a desired volume and concentration of electrolyte within the stack after steady state has been reached.

To prevent damage to the stack by boiling of the liquid, it is necessary to initially heat the stack slowly. As the water is evaporated the rate of heating may be increased. For example, a phosphoric acid fuel cell stack which operates at a nominal temperature of 400° F. was heated from room temperature to about 270° F. at a rate of 4° F. every 15 minutes. The initial concentration of acid in the fully saturated stack was 40% by weight. At 270° the concentration was about 80% by weight. The moist gas was then replaced by hydrogen. The temperature of the stack was further increased at a rate of 15° to 20° F. every 15 minutes until a temperature of 400° F. was reached. Upon reaching this temperature, the stack was put on line (i.e. to produce power). Within a short time (about 30 to 60 minutes) steady state was reached and the acid concentration was at the desired level of about 100%.

Although in the foregoing example a steady state condition was not reached until after the stack was put on line, this is not a requirement of the present process. As a matter of face, if the stack is not to be immediately put on line, it is usually desirable to keep its electrolyte concentration lower than that which would be preferred while the stack is operating. Thus, prior to putting the stack back in service, the stack could be maintained at some lower temperature. The present process may be used to achieve a wide variety of electrolyte volume and concentration combinations by the appropriate selection of variables.

In the embodiment just described electrolyte is deposited only on one side or face of the stack. It should be apparent that the same procedure may be utilized simultaneously on other sides of the stack and will speed the refilling process. Furthermore, it is not intended that the invention be limited to depositing electrolyte on only the uppermost tab. For example, additional conduits 42 may be disposed over other tabs, space permitting. In addition, although the process of the present invention, as described above, includes dripping electrolyte onto the tabs, steady streams of electrolyte would also work well. Any means for depositing the electrolyte on the tabs in a manner which results in the electrolyte being uniformly distributed over all areas of the vertical face so that all the cells receive electrolyte may be used.

In the exemplary embodiment described above, the tabs are extensions of the nonporous separators. It is preferred to use only the nonporous separators, since their relative imperviousness to the electrolyte helps them to distribute the electrolyte better over the width and length of the stack face; however, other components could also be used as tabs either alone or in combination with the separators. For example, the anode electrodes 20 could be extended along with the separators 14 on the same stack face, or the cathode electrodes could be used as tabs instead of the separators.

The foregoing and other objects, features and advantages of the present invention will become more apparent in the light of the following detailed description of the preferred embodiments thereof.

We claim:

1. In a process for adding electrolyte to a fuel cell stack, said stack comprising a plurality of sheet-like elements defining a plurality of fuel cell units disposed one atop the other in abutting relationship, said units defining a substantially flat, vertically extending external face, each unit including a cell comprising a pair of sheet-like spaced apart gas porous electrodes with a porous matrix layer sandwiched therebetween for retaining electrolyte during cell operation, each unit also including a sheet-like substantially non-porous separator, said separator being sandwiched between the cells of adjacent units, the improvement comprising:
   extending at least one of said sheet-like elements of each of a plurality of said fuel cell units outwardly from said stack face to define a plurality of horizontal tabs disposed one above the other;
   depositing dilute electrolyte directly from electrolyte supply means upon substantially the full length, parallel to said stack face, of at least the uppermost tab, said tabs being constructed and arranged such that at least a portion of the deposited electrolyte cascades from tab to tab and down the said face of said stack, said deposited electrolyte being absorbed by capillary action into the elements of said stack, said step of depositing continuing until all of said electrodes and matrix layers of said stack are fully saturated with the dilute electrolyte; and
   thereafter evaporating liquid from said saturated elements under controlled conditions of humidity and temperature until said stack has a desired electrolyte volume and electrolyte concentration therein.

2. The process according to claim 1 wherein the dilute electrolyte is directly deposited only upon the uppermost tab.

3. The process according to claim 1 wherein the step of extending at least one of said sheet-like elements comprises extending only said separator of each fuel cell unit.

4. The process according to claim 1 wherein a portion of the deposited electrolyte is not initially absorbed by said stack and is recaptured as it runs off of said stack, said recaptured dilute electrolyte being recirculated and redeposited on said tabs during said process.

5. The process according to claim 1, wherein said electrolyte supply means includes conduit means, including the step of disposing said conduit means above at least said uppermost tab, said conduit means having a plurality of discrete openings spaced apart substantially uniformly over the length of said tab parallel to said stack face, said step of depositing electrolyte including dripping dilute electrolyte directly onto said tab from said openings.

6. The process according to claim 1 wherein the step of depositing electrolyte comprises depositing phosphoric acid electrolyte.

7. A fuel cell system comprising:
   a fuel cell stack, said stack comprising a plurality of fuel cell units disposed one atop the other in abutting relationship, each unit comprising a plurality of sheet-like elements including a pair of sheet-like spaced apart gas porous electrodes with a matrix layer sandwiched therebetween for retaining electrolyte during cell operation, said pair of electrodes and matrix layer defining a fuel cell, each unit also including a sheet-like substantially non-porous separator, said stack having a substantially flat, vertically extending external face formed by said units, at least one of said sheet-like elements of each of a plurality of said fuel cell units extending outwardly from said stack face to define a plurality of horizontal tabs disposed one above the other along said face; and means external of said stack for depositing electrolyte directly upon substantially the full length, parallel to said stack face, of at least the uppermost of said tabs.

8. The system according to claim 7 including a supply of dilute electrolyte, wherein said means for depositing electrolyte is a conduit connected to said supply of dilute electrolyte and having a plurality of discrete openings spaced apart over the length of said uppermost tab parallel to said stack face, said conduit being adapted to drip electrolyte from said openings onto said tab, including means for delivering dilute electrolyte from said supply to said conduit.

9. The system according to claim 8 wherein said electrolyte is phosphoric acid.

10. The system according to claim 7 wherein said tabs are defined by an extended portion of the said separator plate of each unit.

11. The system according to claim 10 wherein one of said electrodes of each of said fuel cells includes a plurality of gas channels extending thereacross perpendicular to said stack face for carrying a reactant gas across said cell, said system including a reactant gas manifold sealingly engaging said stack face defining a manifold compartment in gas communication with all of said channels, said tabs and said electrolyte depositing means being disposed within said manifold compartment.

12. The system according to claim 11 wherein said means for depositing electrolyte is a conduit having a plurality of discrete openings spaced apart over the length of said uppermost tab parallel to said stack face and adapted to drip electrolyte from said openings onto said tab.

13. The system according to claim 12 including means associated with said conduit for recirculating, to said conduit, dilute electrolyte initially deposited on said uppermost tab but which runs off said stack.

* * * * *